United States Patent [19]

Schenck

[11] 4,438,228
[45] Mar. 20, 1984

[54] FILLED AND PLASTICIZED BLENDS OF LINEAR LOW DENSITY POLYETHYLENE

[75] Inventor: Timothy T. Schenck, Wilmington, Del.

[73] Assignee: E. I. Du Pont de Nemours and Company, Wilmington, Del.

[21] Appl. No.: 273,418

[22] Filed: Jun. 15, 1981

Related U.S. Application Data

[63] Continuation-in-part of Ser. No. 176,783, Aug. 11, 1980, abandoned.

[51] Int. Cl.³ .................. B32B 27/30; C08L 23/08; C08L 23/16
[52] U.S. Cl. ........................ 524/109; 428/95; 428/96; 524/13; 524/15; 524/423; 524/430; 524/445; 524/427; 524/502; 524/528; 524/579; 524/914
[58] Field of Search ............ 260/23 H, 31.6, 31.8 PQ, 260/42.46, 33.6 PQ; 526/348.4, 348.5, 348.6; 524/109, 13, 15, 423, 430, 445, 427, 502, 528, 524, 579, 914; 428/95, 96

[56] References Cited

U.S. PATENT DOCUMENTS

| 3,203,921 | 8/1965 | Rosenfelder | 260/33.6 |
| 3,509,116 | 4/1970 | Cote et al. | 526/348.6 |
| 3,551,194 | 12/1970 | Shepherd et al. | 524/579 |
| 3,684,760 | 8/1972 | Goldbach et al. | 524/579 |
| 3,904,456 | 9/1975 | Schwartz | 156/71 |
| 3,963,802 | 6/1976 | Shih | 260/873 |
| 4,039,507 | 8/1977 | Paige et al. | 524/579 |
| 4,046,945 | 9/1977 | Baxmann et al. | 260/33.6 PQ |
| 4,191,798 | 3/1980 | Schumacher et al. | 428/95 |
| 4,263,186 | 4/1981 | Blüemel | 524/528 |

FOREIGN PATENT DOCUMENTS 694890 10/1967 Belgium .
2319431 10/1973 Fed. Rep. of Germany .
53-42235 9/1978 Japan .

Primary Examiner—Ronald W. Griffin

[57] ABSTRACT

Filled thermoplastic compositions useful, e.g., as sound-deadening sheeting for automotive carpet are obtained by blending about 5-55% by weight of ethylene/α-olefin copolymer, the α-olefin containing from 4 to 10 carbon atoms; about 2-12% by weight of plasticizer selected from the group consisting of processing oils, epoxidized oils, polyesters, polyethers and polyether esters; about 40-90% by weight of filler; and optionally elastomeric polymers.

76 Claims, No Drawings

FILLED AND PLASTICIZED BLENDS OF LINEAR LOW DENSITY POLYETHYLENE

This application is a continuation-in-part of my co-pending application Ser. No. 176,783, filed Aug. 11, 1980, now abandoned.

BACKGROUND OF THE INVENTION

1. Field of the Invention

This invention relates to filled polymer blends and, more specifically, it relates to filled blends of ethylene/α-olefin interpolymers modified with plasticizer.

2. Description of the Prior Art

The use of processing oils and other plasticizers with natural rubber or synthetic rubber-like compounds containing sulfur, accelerators, carbon black and other additives customarily used in the rubber industry is well known. In some instances in order to obtain very high tensile strength values, fillers are omitted. On the other hand, it is known that styrene/butadiene rubber (SBR) compounds, such as are used to adhere jute secondary backings to carpets, can readily hold up to 80% by weight or more of calcium carbonate filler. Vulcanization or curing enhances blend strength.

For thermoplastic elastomeric uses, it is desirable both to avoid curing and to employ fillers to reduce blend costs, as well as to increase blend density.

Industrial noise and its control are items of increasing concern to governmental, environmental, and industrial organizations. Governmental agencies are establishing noise limits to which workers may be exposed to protect their health.

From an aesthetic standpoint, noise also presents problems. Advertisements for "quiet riding" automobiles are ubiquitous. Manufacturers are attempting to make other vehicles quiet as well—including campers, trailers, buses, trucks, and off-road-use farm vehicles.

It has long been known that interposing mass between a sound source and the area to be kept quiet is an effective means for attaining sound deadening. A sheet of lead is thin, flexible, often highly effective, but costly. The challenge, then, is to attain a dense, thin, flexible sheet which can be interposed between a source of noise and the area to be quietened.

Sheets of thermoplastics or of rubberlike materials have long been used as sound-deadening means. To make the sheets flexible, dense, strong, and inexpensive has posed a challenge to compounders for many years. For some uses, such as automobile carpet underlayment, the sound-deadening sheet must also be moldable.

Schwartz U.S. Pat. No. 3,904,456 is related to a method for inhibiting transmission of airborne noise by interposing in the air space between the noise source and the location to be insulated a thin, dense, normally self-supporting film or sheet composed essentially of from about 10 to about 40% by weight of ethylene/vinyl acetate copolymer having an average vinyl acetate content of from about 10 to about 42% by weight and a glass transition temperature of at least about 30° C. below the average ambient temperature in the air space, and from about 60 to about 90% by weight of inorganic filler materials, such as sulfates, carbonates, oxides, etc. of barium, calcium, cadmium, etc., effective to produce an overall density greater than at least 2 grams per cubic centimeter.

German Patent Application No. 2,319,431 discloses sound-deadening composites suitable for use in automobiles which consist of a highly filled polymer sheet (for example, 300–1200 or even up to 1500 parts of filler per 100 parts of polymer) which on its backside is provided with a filler material sheet, e.g., a polymer foam. Suitable polymers for use are disclosed to be terpolymers of ethylene, propylene and a nonconjugated diene (EPDM), polyvinyl chloride (PVC), mixed polymers of ethylene and vinyl acetate (EVA), styrene-butadiene mixed polymers (SBR) and mixtures of these materials with thermoplastic polymers, such as polystyrene and polyolefins.

Rosenfelder U.S. Pat. No. 3,203,921 discloses the use of compositions consisting essentially of 73–88% by weight of a homo- or copolymer of ethylene (which can be ethylene/vinyl acetate or ethylene/ethyl acrylate copolymer), 2–7% by weight of an aliphatic paraffinic hydrocarbon mineral oil and 10–20% by weight of a mineral filler (for example, calcium carbonate, barium sulfate, etc.) for preparing blow-molded objects such as dolls.

Schumacher and Yllo U.S. Pat. No. 4,191,798 discloses compositions consisting essentially of 5–50% by weight of ethylene interpolymer (e.g., ethylene/vinyl acetate copolymer), 2–15% by weight of processing oil, and 50–90% by weight of filler. These compositions have utility when formed as sound-deadening sheet and to have particular utility as a backside coating on automotive carpets.

Belgian Patent No. 694,890 entitled "Surface Hardening Plastics Based on Ethylene/Propylene Elastomers" discloses blends of ethylene/propylene copolymer, mineral oil, filler and a drying oil for use as a surface hardening mastic, where the copolymer contains 25–75 mole percent propylene (about 33–82 weight percent). These blends are claimed to be useful in sealing mastics in buildings and metal constructions.

Japanese Patent Publication No. 042-235/78 (Japanese Application No. 118114/76) discloses hot melt compositions comprising an ethylene/α-olefin copolymer, a hydrocarbon oligomer, a hindered ester, 1–10 percent by weight of colloidal silica and microcrystalline wax. Although these compositions contain mainly olefinic compounds, it is asserted that flexibility and internal loss are maintained while adhesion to olefinic-type film is prevented. The compositions are disclosed to be useful for vibration damping.

U.S. Pat. No. 3,963,802 is related to blends of certain ethylene copolymers and segmented copolyether ester elastomers in specific proportions. Suitable ethylene copolymers are disclosed as those having one or more comonomers selected from the group consisting of alpha-olefins and nonconjugated diolefins, said copolymer having a melting point not greater than 85° C. A suitable copolyether ester is disclosed as consisting of 15–95 percent by weight of short chain ester units and 5–85 percent by weight of long chain ester units, said copolyether ester having a melting point of at least 100° C. It is disclosed that the copolyether ester elastomer is made softer, with retention of toughness and other physical properties, by blending with the ethylene copolymer. It is further disclosed that from 1 to 30 percent by weight of fillers and pigments (e.g., very finely divided silica, alumina, or calcium carbonate) may be incorporated in the blend to increase the toughness and temperature resistance.

SUMMARY OF THE INVENTION

According to the present invention, there is provided a composition consisting essentially of (a) from about 5 to about 55 percent by weight of at least one copolymer of ethylene with at least one α-olefin comonomer containing from 4 to 10 carbon atoms, the ethylene content of said copolymer being from about 75 to about 98% by weight, the comonomer content of said copolymer being from about 2 to about 25 percent by weight, and the melt index of said copolymer being from about 0.1 to about 150; (b) from about 2 to about 12 percent by weight of at least one plasticizer selected from the group consisting of processing oils, epoxidized oils, polyester, polyethers and polyether esters; (c) from about 40 to about 90 percent by weight of filler; and (d) from 0 to about 27% by weight of elastomeric polymer.

Further provided according to the present invention are the above compositions in the form of a sound-deadening sheet.

Still further provided according to the present invention are carpets and especially automotive carpets having a backside coating consisting essentially of the above compositions.

As used herein, the term "consisting essentially of" means that the named ingredients are essential; however, other ingredients which do not prevent the advantages of the present invention from being realized can also be included.

DETAILED DESCRIPTION OF THE INVENTION

It has been found that inclusion of a plasticizer in filled blends of ethylene/α-olefin copolymers and filler allows the preparation of blends containing considerably higher filler levels than can be attained in corresponding binary blends of ethylene/α-olefin copolymers and filler.

Flexible, nonexuding blends based on ethylene/α-olefin copolymers containing very high filler levels can be prepared employing certain plasticizers according to the present invention. In contrast, highly filled plasticized blends based on either conventional high-density or conventional low-density polyethylene homopolymer are of little apparent utility, exhibiting excessive brittleness, poor elongation, and/or plasticizer exudation.

The ethylene/α-olefin copolymers suitable for the composition of the present invention include copolymers with at least one α-olefin comonomer selected from the group consisting of α-olefins containing from four to ten carbon atoms. Preferably the comonomer contains from four to eight carbon atoms. The ethylene/α-olefin copolymers of the composition of the present invention are typically manufactured at a synthesis pressure of less than 5000 psia using transition element catalysts. Processes suitable for manufacturing these copolymers are described in detail in U.S. Pat. No. 4,076,698 and U.S. Pat. No. 4,163,831.

The ethylene content of the copolymer is from about 75 to about 98 percent by weight, and the α-olefin comonomer content is from about 2 to about 25 percent by weight. The preferred ethylene and comonomer levels are from about 80 to about 96 percent by weight and from about 4 to about 20 percent by weight, respectively. A mixture of two or more ethylene copolymers can also be used in the blends of the present invention in place of a single copolymer, provided the α-olefin comonomer content of the mixture (expressed in weight %) is within the above-indicated range. The most preferred comonomer level is from about 6 weight percent to about 16 weight percent. In this range, blends exhibit a combination of tensile properties and flexibility well suited for use as a sound-deadening sheet or for use as carpet backing. Stiffer blends can be obtained by reducing the comonomer content in the copolymer below about 6 weight percent. However, as comonomer content is reduced, elongation decreases and plasticizer compatibility problems might arise. Comonomer content above 16 weight percent results in blends which are less stiff and have lower tensile strength, while their elongation is increased.

Melt index of the copolymer can range from about 0.1 to about 150. The preferred range is from about 0.5 to about 30, wherein physical properties, principally elongation, are at higher levels. Melt index range of from about 1 to about 10 are most preferred to maintain strength.

Generally from about 5 to about 55% by weight of ethylene/α-olefin copolymer is employed in the composition of the present invention, preferably from about 10 to about 35% by weight, and most preferably from about 15 to about 25% by weight.

The plasticizer ingredient of the present invention can be selected from one of several groups. The first group is the group known as processing oils. Three types of processing oils are known—paraffinic, aromatic, and naphthenic. None of these are pure; the grades identify the major oil-type present. Aromatic oils tend to "bleed" from the blends of the present invention. Bleeding is normally not desirable, but could be useful as specialty applications, for example, in concrete forms where mold release characteristics are valued.

Naphthenic and paraffinic oils are non-bleeding in the formulations of the present invention when used in proper ratios and are thus preferable for uses such as automotive carpet backing.

Processing oils are also subdivided by viscosity range. "Thin" oils can be as low as 100–500 SUS (Saybolt Universal Seconds) at 100° F. (38° C.). "Heavy" oils can be as high as 6000 SUS at 100° F. (38° C.). Processing oils, especially naphthenic and paraffinic oils with viscosity of from about 100 to 6000 SUS at 100° F. (38° C.) are preferred.

The second group of plasticizers that are effective in the practice of the present invention is the group comprising epoxidized oils such as epoxidized soybean oil and epoxidized linseed oil.

The third group of plasticizers that are effective in the practice of the present invention are polyesters which, in general are liquid condensation products of a polybasic acid and a polyol. The term "liquid" in the context of the present invention is used to mean pourable at room temperature. The acid component is most often a saturated aliphatic dibasic acid or an aromatic dibasic acid; adipic acid, azelaic acid, phthalic acid, sebacic acid, and glutaric acid, or mixtures of these acids are commonly used. The polyol can be an aliphatic polyol or a poly-oxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic dibasic acids, and a polyol component of aliphatic polyol or even more preferably aliphatic glycol. Most preferred compositions are based on adipic or azelaic acid, and propylene glycol or the 1,3- or 1,4-butane glycol. The molecular weight of these plasticizers can vary from a low of a few hundred up to a high of about 10,000. The molecular weight of commercial products is seldom specified; however, typically in the trade, the molecular weight range of the product is classified as low, medium, or high. The preferred range for purposes of this invention is that classified as medium.

Mixtures of polyesters or epoxidized oils with hydrocarbon oils are also effective plasticizers in the present invention. One objective of using such a mixture is to couple the high efficiency of the relatively high cost polyester or epoxidized oil with the low cost of the hydrocarbon oil. The cost/performance of a compound plasticized with such a mixture can be improved significantly for a given application because properties can be tailored more precisely, or filler levels can be increased. Actually certain advantages in the performance of the blends of the present invention are obtained as will be discussed below, when such a mixture is used as the plasticizer. These polyester plasticizers and their use in filled ethylene interpolymer compositions are described in simultaneously filed U.S. patent application Ser. No. 273,419.

In general, both the epoxidized oils and the polyesters are more "efficient" than processing oils in plasticizing filled ethylene/α-olefin interpolymers; i.e., when used at the same weight percent, they produce blends that are more flexible and have higher percent elongation than the corresponding blends containing processing oil as the plasticizer.

Where a mixture of the polyester plasticizer and a hydrocarbon oil is employed, the relative proportions of the two components can be varied over a wide range depending upon performance objectives. Mixtures containing 50% or less of the polyester are preferred for economic reasons, and most preferred are those containing 20% or less of the polyester.

A fourth group of plasticizers, polyethers and polyether esters, are also effective plasticizers in blends of the ethylene/α-olefin copolymers and fillers of the present invention. In general, polyethers are oligomers or polymers of alkylene oxides; polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid, fatty acids such as lauric and stearic acids are commonly used, for form the ester; the most common examples of these compounds are the mono- and diesters of polyethylene or polypropylene glycol. The molecular weight of polyethers may range up to those typical of high polymers.

Preferred polyether compositions in the practice of this invention are those consisting of the polyols based on random and/or block copolymers of ethylene oxides and propylene oxides. The copolymer polyols provide better performance in terms of efficiency in compounds of the present invention containing very high levels of filler.

Mixture of the polyether or the polyether ester plasticizers with either a polyester plasticizer or a hydrocarbon porcessing oil can also be used in the practice of this invention. The advantage of polyether/polyester combination is the lower cost since the polyethers are cheaper than the polyesters. Combinations of polyether and processing oil are also cheaper because of the lower cost of the oil.

The relative proportions of the two components in a polyether/polyester combination will be adjusted according to the efficiency of the system based on property requirements and cost. Those based on polyester primarily will not be as stiff and will be more expensive, for example, than those based primarily on a polyether or polyether ester.

Where a mixture of the polyether or polyether ester and a hydrocarbon oil is employed, the relative proportions used will again depend upon cost and property requirements. Since the polyethers are more expensive than the processing oils, mixtures containing 50% or less of the polyethers are preferred.

As referred to above, a mixture of processing oil, on the one hand, and epoxidized oil or polyester or polyether or polyether ester, or any combination thereof, on the other hand, can also be used very effectively as the plasticizer for the compositions of the present invention. In fact, such a two- or more component plasticizer system, comprising from about 50 to about 95 percent by weight of processing oil, gives higher tensile elongation than can be obtained using either plasticizer alone at the same level. Maximum elongation is achieved using a mixture of processing oil and polyester or polyether or polyether ester or any combination thereof comprising from about 50 to about 80 percent by weight of processing oil.

The amount of plasticizer(s) in the composition of the present invention is from about 2 to about 12% by weight, preferably from about 3 to about 10% by weight. Most preferably the amount of plasticizer is from about 4 to 8% by weight.

The third essential ingredient of the composition of the present is the filler. The percentage of filler that can be included in the composition of the present invention on a weight basis is primarily a function of the density of the filler. Particle size of the filler has some effect. Fine particle size fillers generally have a tendency to result in higher blend viscosities, and they are also more expensive. The use of fine filler, especially at high filler loading, results in a smoother extrudate surface when molten blend is extruded through a die orifice. The attendant benefits of using fine particle size filler in filled polymer blends are described in patent application Ser. No. 052,927, filed June 27, 1979, issued on Apr. 21, 1981 as U.S. Pat. No. 4,263,196, the disclosure of which is hereby incorporated by reference. No. 9 "Whiting" (calcium carbonate) which has been used extensively in the present compositions (about 95% through 325 mesh) represents a viable midpoint in coarseness, availability and cost.

Examples of suitable fillers are calcium carbonate, barium sulfate, hydrated alumina, clay, magnesium carbonate, calcium sulfate, silica, flyash, cement dust, wood flour, ground rice hulls and mixtures thereof.

Most preferred fillers are calcium carbonate, barium sulfate, hydrated alumina, and mixtures thereof.

The amount of filler present in the composition of the present invention is from about 40% to about 90% by weight, preferably from about 50 to about 85% by weight. Most preferably, when using a filler of medium density, such as calcium carbonate or hydrated alumina, the amount of filler is from about 65 to about 80% by weight, and when using a filler of higher density, such as barium sulfate, the amount of filler is from about 70 to about 85% by weight.

Hydrated alumina can also be used as the filler to obtain blends which are flame retardant.

Polymers, both homo- and copolymers, other than the one referred to above, can also be used to some extent in combination with the above specified polymers without significantly interfering with the advantages obtained by the present invention. Similarly, other ingredients can also be added to the compositions of the present invention by a compounder in order to obtain some desired effect, such as reduction of cost, or enhancement of physical properties. Accordingly, extender or modifying resins, waxes, foaming agents, crosslinking agents, antioxidants, flame retardant agents, tackifying resins, etc. that are widely used, can be included in the compositions of the present invention.

Elastomeric polymers are of interest as modifying resins for the blends of the present invention. They exhibit good compatibility in the blends and can be useful for modifying the flexibility or other physical properties. The blends of the present invention can contain from 0 to about 27% by weight of an elastomer or a mixture of elastomers, preferably from about 1 to about 17% by weight, and most preferably from about 2 to about 12% by weight. Mooney viscosity of the elastomer is preferably in the range of from 20 to 90. Thermoplastic elastomers (e.g., ethylene-propylene rubber, styrene-butadiene-styrene, polyurethane, etc.) or vulcanizable elastomers (e.g., styrene-butadiene rubber, ethylene/propylene/diene terpolymer (EPDM), chlorosulfonated polyethylene, etc.) can be used. Preferred elastomers are ethylene-propylene rubber and EPDM rubber in which the ethylene content should range from about 20 percent by weight to about 80 percent by weight. The diene comonomer (in EPDM) is usually methylene norbornene, ethylidene norbornene, dicyclopentadiene or 1,4-hexadiene, although other dienes may be used, and the concentration of the diene is usually less than about 5 percent by weight. When vulcanizable elastomers are used, they are added in the nonvulcanized state;, if desired, the resulting compound can be cured in a subsequent operation to produce a product with increased tensile strength and improved high temperature performance.

The blends of the present invention are thermoplastic in nature and therefore can be recycled after processing. The recycled material may also contain textile fibers, jute, etc. present in the trim obtained during production of the finished product (e.g., back-coated automotive carpet).

A commercially sized batch-type Banbury or equivalent intensive mixer is entirely suitable for preparing the compositions of the present invention. A Farrel continous mixer ("FCM") is also an excellent mixing device. In either instance, dry ingredients are charged in routine fashion. It is convenient in most cases to inject the plasticizer component directly into the mixing chamber of either unit as per widely used practice with this type of equipment. When more than one plasticizer is used, and where any one of the plasticizers is present in a small amount (less than about 10 weight percent of the total plasticizer mixture), the plasticizers should be preblended before addition to the other ingredients of the present invention. This will facilitate uniform distribution of each plasticizer component in the final compression and thus ensure that optimum properties are obtained. If desired, the copolymer and the plasticizer(s) can be precompounded as a "Master batch" in a suitable intensive mixing device (e.g., Banbury mixer or screw extruder). This "Masterbatch" can then be compounded with the filler and the other remaining ingredients to produce the final composition. A mix cycle of about 3 minutes is generally adequate for the Banbury mixer at an operating temperature usually between 325° and 375° F. The operating rate for the FCM unit generally will fall within ranges predicted by literature prepared by the Farrel Company, Ansonia, Conn.. Again, temperatures between 325° and 375° F. are effective. In both cases, a very low plasticizer level, say about 2–3%, may require higher temperatures, while plasticizer levels above about 7% may mix well at lower mixer temperatures. While not evaluated, it is expected that other devices for compounding of viscous mixes (MI of 0.1 to 20) should be entirely satisfactory—but in any case, prototype trials in advance are desirable.

Once blends are mixed, routine commercial practices may be used, such as underwater melt cutting plus drying or use of sheeting plus chopping methods, to produce a final pelletized product.

Primary use for the compositions of the present invention will probably be in the sheeting field, particularly for low-cost, dense, sound-deadening structures. Outstanding characteristics such as improved "hand", "drape," reduced stiffness, and reduced thickness of the extruded sheeting result from the compositions of the present invention.

The blends of the present invention can readily be extruded onto a substrate, such as an automotive carpet, or can be extruded or calendered as unsupported film or sheet. Depending upon the equipment used, and the compounding techniques employed, it is possible to extrude wide ranges of film thickness, from below 20 mils to above 100 mils. This then provides industry with an opportunity to vary the amount of sound deadening to be attained by varying film thickness, density of blends, ratio of filler load to binder, and similar techniques well known in the art.

The sound-deadening sheet produced may be used in various ways:

When applied to automotive carpet, blends described are an effective and economic means to deaden sound, while also simultaneously serving as a moldable support for the carpet.

When used in sheet form, the blends can be installed in other areas of an automobile, truck, bus, etc., such as side panels, door panels, roofing areas, etc.

In sheet form, blends may be used as drapes or hangings to shield or to surround a noisy piece of factory equipment such as a loom, a forging press, etc.

In laminated sheet form, blends, faced with another material, might be used to achieve both a decorative and a functional use—such as dividing panels in an open-format office.

The application of the compositions of the present invention in carpets, and particularly in automotive carpets, is essentially identical to the methods as already described in U.S. Pat. No. 4,191,798, the disclosure of which is hereby incorporated by reference.

The following examples are given for the purpose of illustrating the present invention. All parts and percentages are by weight unless otherwise specified.

COMPARATIVE EXAMPLES 1-3

These examples show the increasing difficulty encountered in making highly filled binary blends using ethylene/α-olefin copolymer as the sole binder. All ingredients were premixed in a one-gallon can by being shaken manually for about 0.5 minute. The material was then charged to a laboratory-sized Banbury intensive mixer. Mix conditions used were fluxing for about 3 minutes at a temperature of about 325°-375° F. Compositions and physical properties are summarized in Table 1. Increasing the filler ($CaCO_3$) level to 60% from 50% reduced elongation by about 95%. A further filler increase to 70% resulted in a mixture which no longer would flux in a Banbury mixer, even after about 10 minutes of mixing time. The product discharged from the mixer as uncompounded, dry ingredients.

TABLE 1
COMPOSITION AND PHYSICAL PROPERTIES OF BINARY BLENDS OF ETHYLENE/α-OLEFIN COPOLYMER AND CALCIUM CARBONATE

|  | Ex. C1 | Ex. C2 | Ex. C3 |
|---|---|---|---|
| Ingredients |  |  |  |
| Ethylene/α-olefin #1[1] | 50 | 40 | 30 |
| #9 "Whiting"[2] | 50 | 60 | 70 |
| Physical Properties |  |  |  |
| Sp. Gr. of Blend[3] | 1.37 | 1.51 | ↓ |
| Tensile Strength, psi[4] | 1654 | 1841 | ↓ |
| Tensile Strength, kPa | 11,403 | 12,692 | DID |
| Elongation, %[4] | 487 | 27 | NOT |
| Thickness of Strip |  |  | FLUX |
| mils | 63 | 66 | ↑ |
| mm | 1.60 | 1.68 | ↑ |
| Stiffness of Strip, g.[5] | 320 | 390 | ↑ |

[1]"Dowlex" 2045; Dow Chemical Company; ethylene/α-olefin copolymer (about 15% octene comonomer) M.I. = 1.14, Density = 0.913
[2]Calcium Carbonate, as commercial ground limestone; Georgia Marble Company.
[3]Referred to water.
[4]Tensile strength and elongation measurements made on Instron Tester using ASTM Method D1708 at crosshead speed of 2 in. (5.1 cm)/min. Samples are 0.876 in. (2.23 cm.) × 0.187 in. (0.47 cm.) in size, at strip thickness shown in table.
[5]Stiffness of strip measured by placing a 1 in. × 6 in. (2.54 cm. × 15.2 cm.) strip on a platform scale and measuring the force required to make the ends of the test strip meet at room temperature. Strips were prepared by molding the material in a heated Pasadena press @ 175° C.

EXAMPLES 1 AND 2 AND COMPARATIVE EXAMPLES 4 AND 5

The blends of these examples were prepared and their physical properties were determined in the same manner as those of Comparative Examples 1-3. Compositions and physical properties are summarized in Table 2. Examples 1 and 2 demonstrate that, by use of an appropriate plasticizer, highly filled (in these examples, 72.5% $CaCO_3$) ethylene/α-olefin copolymers exhibiting useful properties can be produced. Without plasticizer, blends at only 70% filler cannot be successfully compounded in a Banbury mixer (Example C3). With plasticizer, blends at 72.5% filler loading (Ex. 1 and Ex. 2) exhibit comparable elongation and better flexibility than binary blends of polymer/filler at only 60% loading (Ex. C2).

Example C4 illustrates what happens when the ethylene/α-olefin copolymer, in a blend with filler and processing oil plasticizer, is replaced with low-density polyethylene homopolymer. The resulting blend exhibits about 75% lower elongation and is very brittle, failing catastrophically in the crease test. Moreover, the blend exudes plasticizer freely, with oil droplets visible on the surface after only one day of storage at room conditions.

Example C5 illustrates what happens when the ethylene/α-olefin copolymer is replaced with high-density polyethylene homopolymer. The resulting blend has low elongation and is extremely brittle, failing in the crease test and also breaking into two pieces in the "stiffness" test.

TABLE 2
COMPOSITION AND PHYSICAL PROPERTIES OF ETHYLENE POLYMER-CALCIUM CARBONATE-PROCESSING OIL BLENDS

|  | Ex. 1 | Ex. 2 | Ex. C4 | Ex. C5 |
|---|---|---|---|---|
| Ingredients |  |  |  |  |
| Ethylene/α-olefin #1 | 20.2 | — | — | — |
| Ethylene/α-olefin #2[1] | — | 20.2 | — | — |
| Polyethylene #1[2] | — | — | 20.2 | — |
| Polyethylene #2[3] | — | — | — | 20.2 |
| #9 Whiting | 72.5 | 72.5 | 72.5 | 72.5 |
| Naphthenic Oil[4] | 7.3 | 7.3 | 7.3 | 7.3 |
| Physical Properties |  |  |  |  |
| Sp. Gr. of Blend | 1.77 | 1.78 | 1.78 | 1.78 |
| Tensile Strength, psi | 717 | 737 | 578 | 879 |
| kPa | 4943 | 5081 | 3986 | 6060 |
| Elongation, % | 34 | 21 | 5 | 10 |
| Thickness of Strip |  |  |  |  |
| mils | 60 | 60 | 59 | 63 |
| mm | 1.52 | 1.52 | 1.50 | 1.60 |
| Stiffness of Strip, g. | 157 | 179 | 118 | BROKE IN TEST |
| Crease Test[5] | Pass | Pass | Fail | Fail |
| Plasticizer Exudation | None | None | Heavy | None |

[1]"DNGA" 7344; Union Carbide Company; ethylene/α-olefin copolymer (about 5.5% butene comonomer) M.I. = 1.8, Density = 0.922 g./cc.
[2]"Alathon" 20; Du Pont Company; Low Density Polyethylene Homopolymer; M.I. = 1.9, Density = 0.920
[3]"Alathon" 7835; Du Pont Company; High Density Polyethylene Homopolymer; M.I. = 3.0, Density = 0.960.
[4]"Circosol" 4240; Sun Petroleum Products Company. The composition for the oil as given by the supplier is 39% naphthenic carbon, 40% paraffinic carbon, and 21% aromatic carbon.
[5]The crease test is performed by folding a 1" × 6" strip at ambient temperature back upon itself and pinching or pressing the folded area flat. (This corresponds to folding the sample over a mandrel of zero diameter). If a clean break occurs, with the strip splitting into separate pieces, the sample fails the test. If the sample does not separate into two pieces, it passes the test.

EXAMPLES 3 TO 5

Examples 3 to 5 illustrate the effect on blend properties of using an epoxidized oil or liquid polyester as the plasticizer in either total or partial replacement of the processing oil plasticizer. Results are presented in Table 3.

In Example 3, 100% replacement of the naphthenic oil with the epoxidized oil results in a sixfold increase in elongation and a 60% reduction in stiffness.

In Example 4, 100% replacement of the naphthenic oil with the liquid polyester results in an eightfold increase in elongation and a 65% reduction in stiffness.

Example 5 illustrates the effect of replacing 50% of the naphthenic oil in the blend with the liquid polyester. Elongation is increased tenfold and stiffness is reduced 62%. This example also illustrates an interesting and unexpected effect: a blend containing a one/one mixture of processing oil and liquid polyester exhibits higher elongation than the blends containing either plasticizer used alone. (Compare Examples 5, 4, and 1).

It becomes apparent from these examples that the selection of the plasticizer (or combination of plasticizers) in the practice of the present invention offers the user significant latitude in obtaining physical properties appropriate for his particular enduse or application.

TABLE 3

COMPOSITION AND PHYSICAL PROPERTIES OF BLENDS OF ETHYLENE/α-OLEFIN COPOLYMER-CALCIUM CARBONATE-PLASTICIZER

|  | Ex. 3 | Ex. 4 | Ex. 5 | Ex. 1 |
|---|---|---|---|---|
| Ingredients |  |  |  |  |
| Ethylene/α-olefin #1 | 20.2 | 20.2 | 20.2 | 20.2 |
| #9 "Whiting" | 72.5 | 72.5 | 72.5 | 72.5 |
| Epoxidized Oil[1] | 7.3 | — | — | — |
| Liquid Polyester[2] | — | 7.3 | 3.65 | — |
| Naphthenic Oil[3] | — | — | 3.65 | 7.3 |
| Physical Properties |  |  |  |  |
| Sp. Gr. of Blend | 1.76 | 1.80 | 1.82 | 1.77 |
| Tensile Strength, psi | 400 | 471 | 453 | 717 |
| kPa | 2758 | 3247 | 3123 | 4943 |
| Elongation, % | 217 | 289 | 369 | 34 |
| Thickness of Strip |  |  |  |  |
| mils | 59 | 58 | 58 | 60 |
| mm | 1.50 | 1.47 | 1.47 | 1.52 |
| Stiffness of Strip, g. | 62 | 55 | 60 | 157 |

[1]"Paraplex" G-62; Rohm & Haas Company; epoxidized soybean oil.
[2]"Santicizer" 429; Monsanto Company; medium molecular weight condensation product of aliphatic dibasic acid and glycol, specific gravity 1.1, acid number 2.2 mg KOH/g.
[3]"Circosol" 4240; Sun Oil Company

EXAMPLES 6 AND 7

Example 6 shows the effect of replacing part of the ethylene/α-olefin polymer in a blend with an elastomeric polymer, ethylene/propylene/diene monomer (EPDM) rubber. The resulting blend, as shown in Table 4, exhibits a twentyfold increase in elongation and a 45% reduction in stiffnes. (Compare Example 6 and Example 1.) More or less elastomer can be incorporated depending on the particular physical properties desired. Elastomeric polymer can also be effectively incorporated in blends plasticized with epoxidized oil or liquid polyester, polyether or polyether ester. Example 7 is an elastomer containing blend plasticized with a liquid polyester.

TABLE 4

COMPOSITION AND PHYSICAL PROPERTIES OF BLENDS OF ETHYLENE/α-OLEFIN COPOLYMER-EPDM RUBBER-CALCIUM CARBONATE-PLASTICIZER

|  | Ex. 6 | Ex. 7 | Ex. 1 |
|---|---|---|---|
| Ingredients |  |  |  |
| Ethylene/α-olefin #1 | 10.1 | 10.1 | 20.2 |
| EPDM Rubber[1] | 10.1 | 10.1 | — |
| #9 "Whiting" | 72.5 | 72.5 | 72.5 |
| Naphthenic Oil[2] | 7.3 | — | 7.3 |
| Liquid Polyester[3] | — | 7.3 | — |
| Physcial Properties |  |  |  |
| Sp. Gr. of Blend | 1.78 | 1.79 | 1.77 |
| Tensile Strength, psi | 490 | 398 | 717 |
| kPa | 3378 | 2744 | 4943 |
| Elongation, % | 670 | 510 | 34 |
| Thickness of Strip |  |  |  |
| mils | 60 | 60 | 60 |
| mm | 1.52 | 1.52 | 1.52 |
| Stiffness of Strip, g. | 86 | 29 | 157 |

[1]"Nordel" 1560 hydrocarbon rubber; E. I. du Pont de Nemours and Company; sulfur curable polymer based on ethylene/propylene/1,4-hexadiene.
[2]"Circosol" 4240.
[3]"Santicizer" 429.

I claim:

1. A composition consisting essentially of (a) from about 5 to about 55% by weight of at least one copolymer of ethylene with at least one α-olefin comonomer said comonomer containing from 4 to 10 carbon atoms, the ethylene content of said copolymer being from about 75 to about 98% by weight, the comonomer content of said copolymer being from about 2 to about 25% by weight, and the melt index of said copolymer being from about 0.1 to about 150; (b) from about 2 to about 12% by weight of at least one plasticizer selected from the group consisting of processing oils, epoxidized oils, polyesters, polyethers and polyether esters; and (c) from about 40 to about 90% by weight of filler.

2. The composition of claim 1 wherein (a) said ethylene/α-olefin copolymer is present in an amount of from about 10 to about 35% by weight; (b) said plasticizer is present in an amount of from about 3 to about 10% by weight; and (c) said filler is present in an amount of from about 50 to about 85% by weight.

3. The composition of claim 2 wherein the α-olefin comonomer contains from 4 to 8 carbon atoms, the ethylene content of the ethylene/α-olefin copolymer is from about 80 to about 96% by weight, the comonomer content is from about 4 to about 20% by weight, and the melt index of said copolymer is from about 0.5 to about 30.

4. The composition of claim 3 wherein said filler is selected from the group consisting of calcium carbonate, barium sulfate, hydrated alumina, clay, magnesium carbonate, calcium sulfate, silica, flyash, cement dust, wood flour, ground rice hulls and mixtures thereof.

5. The composition of claim 4 wherein said filler is selected from the group consisting of calcium carbonate, barium sulfate, hydrated alumina and mixtures thereof.

6. The composition of claim 4 wherein said plasticizer is selected from the group consisting of processing oils.

7. The composition of claim 6 wherein said processing oil is selected from the group consisting of naphthenic and paraffinic oils.

8. The composition of claim 5 wherein said plasticizer is a mixture of (α) processing oil and (β) epoxidized oil or polyester or polyether or polyether ester or any combination thereof, wherein said processing oil is present in an amount of from about 50 to about 95% by weight of said plasticizer.

9. The composition of claim 8 wherein said processing oil is present in an amount of from about 50 to about 80 percent by weight.

10. The composition of claim 4 wherein said plasticizer is selected from the group consisting of polyesters.

11. The composition of claim 10 wherein said polyester is a liquid condensation product of (α) dibasic acid selected from the group consisting of saturated aliphatic dibasic acids and aromatic dibasic acids and (β) polyol selected from the group consisting of aliphatic polyols and polyoxyalkylenepolyols.

12. The composition of claim 11 wherein greater than 50 percent by weight of the acid component of said polyester is selected from aliphatic dibasic acids and the polyol component is selected from aliphatic glycols.

13. The composition of claim 4 wherein said plasticizer is selected from the group consisting of polyethers.

14. The composition of claim 13 wherein said polyether is selected from polyols based on random and block copolymers of ethylene oxides or propylene oxides.

15. The composition of claim 4 wherein said plasticizer is selected from the group consisting of polyether esters.

16. The composition of claim 15 wherein said polyether ester is selected from esters of polyols based on polymers or copolymers of ethylene oxides or propylene oxides.

17. The composition of claim 4 wherein said plasticizer is selected from the group consisting of epoxidized oils.

18. The composition of claim 17 wherein said epoxidized oil is selected from the group consisting of epoxidized soybean oil and epoxidized linseed oil.

19. The composition of claim 4 wherein (a) said ethylene/α-olefin copolymer is present in an amount of from about 15 to about 25 percent by weight; (b) said plasticizer is present in an amount of from about 4 to about 8 percent by weight; and (c) when said filler is calcium carbonate or hydrated alumina the amount of filler is from about 65 to about 80 percent by weight, and when said filler is barium sulfate the amount of filler is from about 70 to about 85 percent by weight.

20. The composition of claim 19 wherein the ethylene content of the ethylene/α-olefin copolymer is from about 84 to about 94 percent by weight, the comonomer content is from about 6 to about 16 percent by weight, and the melt index of said copolymer is from about 1 to about 10.

21. The composition of claim 20 wherein the comonomer is butene.

22. The composition of claim 20 wherein the comonomer is octene.

23. A sound deadening sheet prepared from a composition consisting essentially of (a) from about 5 to about 55% by weight of at least one copolymer of ethylene with at least one α-olefin comonomer said comonomer containing from 4 to 10 carbon atoms, the ethylene content of said copolymer being from about 75 to about 98% by weight, the comonomer content of said copolymer being from about 2 to about 25% by weight, and the melt index of said copolymer being from about 0.1 to about 150; (b) from about 2 to about 12% by weight of at least one plasticizer selected from the group consisting of processing oils, epoxidized oils, polyesters, polyethers and polyether esters; (c) from about 40 to about 90% by weight of filler; and (d) from 0 to about 27% by weight of elastomeric polymer.

24. The sound deadening sheet of claim 23 wherein (a) said ethylene/α-olefin copolymer is present in an amount of from about 10 to about 35% by weight; (b) said plasticizer is present in an amount of from about 3 to about 10% by weight; (c) said filler is present in an amount of from about 50 to about 85% by weight and wherein the α-olefin comonomer contains from 4 to 8 carbon atoms, the ethylene content of the ethylene/α-olefin copolymer is from about 80 to about 96% by weight, the comonomer content is from about 4 to about 20% by weight, the melt index of said copolymer is from about 0.5 to about 30 and wherein said filler is selected from the group consisting of calcium carbonate, barium sulfate, hydrated alumina, clay, magnesium carbonate, calcium sulfate, silica, flyash, cement dust, wood flour, ground rice hulls and mixtures thereof.

25. The sound deadening sheet of claim 24 wherein said plasticizer is a mixture of (α) processing oil selected from the group consisting of naphthenic and paraffinic oils and (β) epoxidized oil or polyester or polyether or polyether ester or any combination thereof, wherein said processing oil is present in an amount of from about 50 to about 95% by weight of said plasticizer.

26. The sound deadening sheet of claim 24 wherein said plasticizer is selected from the group consisting of polyesters and said polyester is a liquid condensation product of (α) dibasic acid selected from the group consisting of saturated aliphatic dibasic acids and aromatic dibasic acids and (β) polyol selected from the group consisting of aliphatic polyols and polyoxyalkylenepolyols.

27. The sound deadening sheet of claim 24 wherein said plasticizer is selected from the group consisting of polyethers.

28. The sound deadening sheet of claim 24 wherein said plasticizer is selected from the group consisting of polyether esters.

29. The sound deadening sheet of claim 24 wherein said plasticizer is selected from the group consisting of epoxidized oils.

30. The sound deadening sheet of claim 24 wherein (a) said ethylene/α-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight.

31. The sound deadening sheet of claim 30 wherein the ethylene content of the ethylene/α-olefin copolymer is from about 84 to about 94% by weight, the comonomer content is from about 6 to about 16% by weight, the melt index of said copolymer is from about 1 to about 10 and wherein the comonomer is butene.

32. The sound deadening sheet of claim 31 wherein the comonomer is octene.

33. The sound deadening sheet of claim 24 wherein said elastomeric polymer is present in an amount of from about 1 to about 17% by weight and is selected from the group consisting of styrene-butadiene rubber, polyisobutylene, ethylene/propylene rubber, and terpolymer of ethylene, propylene and a diene monomer.

34. The sound deadening sheet of claim 33 wherein said plasticizer is a mixture of (α) processing oil selected from the group consisting of naphthenic and paraffinic oils and (β) epoxidized oil or polyester or polyether or polyether ester or any combination thereof, wherein said processing oil is present in an amount of from about 50 to about 95% by weight of said plasticizer.

35. The sound deadening sheet of claim 33 wherein said plasticizer is selected from the group consisting of polyesters, polyethers, polyether esters and epoxidized oils.

36. The sound deadening sheet of claim 33 wherein (a) said ethylene/α-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight and wherein the ethylene content of the ethylene/α-olefin copolymer is from about 84 to about 94% by weight, the comonomer content is from about 6 to about 16% by weight, the melt index of said copolymer is from about 1 to about 10 and wherein the comonomer is selected from the group consisting of butene and octene.

37. The sound deadening sheet of claim 33 wherein said elastomeric polymer is present in an amount of from about 2 to about 12% by weight and is selected from the group consisting of ethylene/propylene rubber and terpolymers of ethylene, propylene and a diene monomer, wherein the ethylene content is from about 20 to about 80% by weight and the diene content is from 0 to about 5% by weight, said dienes being selected from the group consisting of methylene norbornene, ethylidene norbornene, dicyclopentadiene and 1,4-hexadiene.

38. The sound deadening sheet of claim 37 wherein said plasticizer is a mixture of ($\alpha$) processing oil selected from the group consisting of naphthenic and paraffinic oils and ($\beta$) epoxidized oil or polyester or polyether or polyether ester or any combination thereof, wherein said processing oil is present in an amount of from about 50 to about 95% by weight of said plasticizer.

39. The sound deadening sheet of claim 37 wherein said plasticizer is selected from the group consisting of polyesters, polyethers, polyether esters and epoxidized oils.

40. The sound deadening sheet of claim 37 wherein (a) said ethylene/$\alpha$-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of fillers is from about 70 to about 85% by weight and wherein the ethylene content of the ethylene/$\alpha$-olefin copolymer is from about 84 to about 94% by weight, the comonomer content is from about 6 to about 16% by weight, the melt index of said copolymer is from about 1 to about 10 and wherein the comonomer is selected from the group consisting of butene and octene.

41. A carpet having a backside coating prepared from a composition consisting essentially of (a) from about 5 to about 55% by weight of at least one copolymer of ethylene with at least one $\alpha$-olefin comonomer said comonomer containing from 4 to 10 carbon atoms, the ethylene content of said copolymer being from about 75 to about 98% by weight, the comonomer content of said copolymer being from about 2 to about 25% by weight, and the melt index of said copolymer being from about 0.1 to about 150; (b) from about 2 to about 12% by weight of at least one plasticizer selected from the group consisting of processing oils, epoxidized oils, polyesters, polyethers and polyether esters; (c) from about 40 to about 90% by weight of filler; and (d) from 0 to about 27% by weight of elastomeric polymer.

42. The carpet of claim 41 wherein (a) said ethylene/$\alpha$-olefin copolymer is present in an amount of from about 10 to about 35% by weight; (b) said plasticizer is present in an amount of from about 3 to about 10% by weight; (c) said filler is present in an amount of from about 50 to about 85% by weight and wherein the $\alpha$-olefin comonomer contains from 4 to 8 carbon atoms, the ethylene content of the ethylene/$\alpha$-olefin copolymer is from about 80 to about 96% by weight, the comonomer content is from about 4 to about 20% by weight, the melt index of said copolymer is from about 0.5 to about 30 and wherein said filler is selected from the group consisting of calcium carbonate, barium sulfate, hydrated alumina, clay, magnesium carbonate, calcium sulfate, silica, flyash, cement dust, wood flour, ground rice hulls and mixtures thereof.

43. The carpet of claim 42 wherein said plasticizer is a mixture of ($\alpha$) processing oil selected from the group consisting of naphthenic and paraffinic oils and ($\beta$) epoxidized oil or polyester or polyether or polyether ester or any combination thereof, wherein said processing oil is present in an amount of from about 50 to about 95% by weight of said plasticizer.

44. The carpet of claim 42 wherein said plasticizer is selected from the group consisting of polyesters and said polyester is a liquid condensation product of ($\alpha$) dibasic acid selected from the group consisting of saturated aliphatic dibasic acids and aromatic dibasic acids and ($\beta$) polyol selected from the group consisting of aliphatic polyols and polyoxyalkylenepolyols.

45. The carpet of claim 42 wherein said plasticizer is selected from the group consisting of polyethers.

46. The carpet of claim 42 wherein said plasticizer is selected from the group consisting of polyether esters.

47. The carpet of claim 42 wherein said plasticizer is selected from the group consisting of epoxidized oils.

48. The carpet of claim 42 wherein (a) said ethylene/$\alpha$-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight.

49. The carpet of claim 48 wherein the ethylene content of the ethylene/$\alpha$-olefin copolymer is from about 84 to about 94% by weight, the comonomer content is from about 6 to about 16% by weight, the melt index of said copolymer is from about 1 to about 10 and wherein the comonomer is butene.

50. The carpet of claim 49 wherein the comonomer is octene.

51. The carpet of claim 42 wherein said elastomeric polymer is present in an amount of from about 1 to about 17% by weight and is selected from the group consisting of styrenebutadiene rubber, polyisobutylene, ethylene/propylene rubber, and terpolymer of ethylene, propylene and a diene monomer.

52. The carpet of claim 51 wherein said plasticizer is a mixture of ($\alpha$) processing oil selected from the group consisting of naphthenic and paraffinic oils and ($\beta$) epoxidized oil or polyester or polyether or polyether ester or any combination thereof, wherein said processing oil is present in an amount of from about 50 to about 95% by weight of said plasticizer.

53. The carpet of claim 51 wherein said plasticizer is selected from the group consisting of polyesters, polyethers, polyether esters and epoxidized oils.

54. The carpet of claim 51 wherein (a) said ethylene/$\alpha$-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight and the ethylene content of the ethylene/$\alpha$-olefin copolymer is from about 84 to about 94% by weight, the comonomer content is from about 6 to about 16% by weight, the melt index of said copolymer is from about 1 to about 10 and wherein the comonomer is selected from the group consisting of butene and octene.

55. The carpet of claim 51 wherein said elastomeric polymer is present in an amount of from about 2 to about 12% by weight and is selected from the group consisting of ethylene/propylene rubber and terpolymers of ethylene, propylene and a diene monomer, wherein the ethylene content is from about 20 to about 80% by weight and the diene content is from 0 to about 5% by weight, said dienes being selected from the group consisting of methylene norbornene, ethylidene norbornene, dicyclopentadiene and 1,4-hexadiene.

56. The carpet of claim 55 wherein said plasticizer is a mixture of ($\alpha$) processing oil selected from the group consisting of naphthenic and paraffinic oils and ($\beta$) epoxidized oil or polyester or polyether or polyether ester or any combination thereof, wherein said processing oil is present in an amount of from about 50 to about 95% by weight of said plasticizer.

57. The carpet of claim 55 wherein said plasticizer is selected from the group consisting of polyesters, polyethers, polyether esters and epoxidized oils.

58. The carpet of claim 55 wherein (a) said ethylene/$\alpha$-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight and the ethylene content of the ethylene/$\alpha$-olefin copolymer is from about 84 to about 94% by weight, the comonomer content is from about 6 to about 16% by weight, the melt index of said copolymer is from about 1 to about 10 and wherein the comonomer is selected from the group consisting of butene and octene.

59. An automotive carpet having a backside coating prepared from a composition consisting essentially of (a) from about 5 to about 55% by weight of at least one copolymer of ethylene with at least one $\alpha$-olefin comonomer said comonomer containing from 4 to 10 carbon atoms, the ethylene content of said copolymer being from about 75 to 98% by weight, the comonomer content of said copolymer being from about 2 to about 25% by weight, and the melt index of said copolymer being from about 0.1 to about 150; (b) from about 2 to about 12% by weight of at least one plasticizer selected from the group consisting of processing oils, epoxidized oils, polyesters, polyethers and polyether esters; (c) from about 40 to about 90% by weight of filler; and (d) from 0 to about 27% by weight of elastomeric polymer.

60. The automotive carpet of claim 59 wherein (a) said ethylene/$\alpha$-olefin copolymer is present in an amount of from about 10 to about 35% by weight; (b) said plasticizer is present in an amount of from about 3 to about 10% by weight; (c) said filler is present in an amount of from about 50 to about 85% by weight and wherein the $\alpha$-olefin comonomer contains from 4 to 8 carbon atoms, the ethylene content of the ethylene/$\alpha$-olefin copolymer is from about 80 to about 96% by weight, the comonomer content is from about 4 to about 20% by weight, the melt index of said copolymer is from about 0.5 to about 30 and wherein said filler is selected from the group consisting of calcium carbonate, barium sulfate, hydrated alumina, clay, magnesium carbonate, calcium sulfate, silica, flyash, cement dust, wood flour, ground rice hulls and mixtures thereof.

61. The automotive carpet of claim 60 wherein said plasticizer is a mixture of ($\alpha$) processing oil selected from the group consisting of naphthenic and paraffinic oil and ($\beta$) epoxidized oil or polyester or polyether or polyether ester or any combination thereof, wherein said processing oil is present in an amount of from about 50 to about 95% by weight of said plasticizer.

62. The automotive carpet of claim 60 wherein said plasticizer is selected from the group consisting of polyesters and said polyester is a liquid condensation product of ($\alpha$) dibasic acid selected from the group consisting of saturated aliphatic dibasic acids and aromatic dibasic acids and ($\beta$) polyol selected from the group consisting of aliphatic polyols and polyoxyalkylenepolyols.

63. The automotive carpet of claim 60 wherein said plasticizer is selected from the group consisting of polyethers.

64. The automotive carpet of claim 60 wherein said plasticizer is selected from the group consisting of polyether esters.

65. The automotive carpet of claim 60 wherein said plasticizer is selected from the group consisting of epoxidized oils.

66. The automotive carpet of claim 60 wherein (a) said ethylene/$\alpha$-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight.

67. The automotive carpet of claim 66 wherein the ethylene content of the ethylene/$\alpha$-olefin copolymer is from about 84 to about 94% by weight, the comonomer content is from about 6 to about 16% by weight, the melt index of said copolymer is from about 1 to about 10 and wherein the comonomer is butene.

68. The automotive carpet of claim 67 wherein the comonomer is octene.

69. The automotive carpet of claim 60 wherein said elastomeric polymer is present in an amount of from about 1 to about 17% by weight and is selected from the group consisting of styrene-butadiene rubber, polyisobutylene, ethylene/propylene rubber, and terpolymer of ethylene, propylene and a diene monomer.

70. The automotive carpet of claim 69 wherein said plasticizer is a mixture of ($\alpha$) processing oil selected from the group consisting of naphthenic and paraffinic oils and (2) epoxidized oil or polyester or polyether or polyether ester or any combination thereof, wherein said processing oil is present in an amount of from about 50 to about 95% by weight of said plasticizer.

71. The automotive carpet of claim 69 wherein said plasticizer is selected from the group consisting of polyesters, polyethers, polyether esters and epoxidized oils.

72. The automotive carpet of claim 69 wherein (a) said ethylene/$\alpha$-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight and the ethylene content of the ethylene/$\alpha$-olefin copolymer is from about 84 to about 94% by weight, the comonomer content is from about 6 to about 16% by weight, the melt index of said copolymer is from about 1 to about 10 and wherein the comonomer is selected from the group consisting of butene and octene.

73. The automotive carpet of claim 69 wherein said elastomeric polymer is present in an amount of from about 2 to about 12% by weight and is selected from the group consisting of ethylene/propylene rubber and terpolymers of ethylene, propylene and a diene monomer, wherein the ethylene content is from about 20 to about 80% by weight and the diene content is from about 0 to about 5% by weight, said dienes being selected from the group consisting of methylene norbornene, ethylidene norbornene, dicyclopentadiene and 1,4-hexadiene.

74. The automotive carpet of claim 73 wherein said plasticizer is a mixture of ($\alpha$) processing oil selected from the group consisting of naphthenic and paraffinic oils and ($\beta$) epoxidized oil or polyester or polyether or polyether ester or any combination thereof, wherein said processing oil is present in an amount of from about 50 to about 95% by weight of said plasticizer.

75. The automotive carpet of claim 73 wherein said plasticizer is selected from the group consisting of polyesters, polyethers, polyether esters and epoxidized oils.

76. The automotive carpet of claim 73 wherein (a) said ethylene/$\alpha$-olefin copolymer is present in an amount of from about 15 to about 25% by weight; (b) said plasticizer is present in an amount of from about 4 to about 8% by weight; and (c) when said filler is calcium carbonate or hydrated alumina the amount of filler is from about 65 to about 80% by weight, and when said filler is barium sulfate the amount of filler is from about 70 to about 85% by weight and the ethylene content of the ethylene/$\alpha$-olefin copolymer is from about 84 to about 94% by weight, the comonomer content is from about 6 to about 16% by weight, the melt index of said copolymer is from about 1 to about 10 and wherein the comonomer is selected from the group consisting of butene and octene.

* * * * *